(12) United States Patent
Sylvan et al.

(10) Patent No.: US 9,400,695 B2
(45) Date of Patent: Jul. 26, 2016

(54) LOW LATENCY RENDERING OF OBJECTS

(75) Inventors: Sebastian Sylvan, Staffordshire (GB); Nicholas Burton, Derby (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 925 days.

(21) Appl. No.: 12/713,442

(22) Filed: Feb. 26, 2010

(65) Prior Publication Data

US 2011/0210982 A1  Sep. 1, 2011

(51) Int. Cl.
  *G06F 9/00* (2006.01)
  *G06F 9/50* (2006.01)
  *G06T 15/00* (2011.01)

(52) U.S. Cl.
  CPC ............ *G06F 9/5038* (2013.01); *G06T 15/005* (2013.01); *A63F 2300/1093* (2013.01); *A63F 2300/203* (2013.01); *A63F 2300/63* (2013.01); *A63F 2300/6607* (2013.01); *G06F 2209/5014* (2013.01); *G06F 2209/5021* (2013.01)

(58) Field of Classification Search
  CPC ....... G09G 5/00; G09G 5/14; G09G 2340/10; G09G 2340/125; G06T 11/60; G06T 15/503
  See application file for complete search history.

(56) References Cited

U.S. PATENT DOCUMENTS

| | | | |
|---|---|---|---|
| 5,704,836 A * | 1/1998 | Norton et al. | 463/36 |
| 6,046,709 A * | 4/2000 | Shelton et al. | 345/1.1 |
| 6,075,543 A | 6/2000 | Akeley | |
| 6,256,033 B1 | 7/2001 | Nguyen | |
| 6,539,931 B2 | 4/2003 | Trajkovic et al. | |
| 6,628,287 B1 | 9/2003 | Duda et al. | |
| 6,674,877 B1 | 1/2004 | Jojic et al. | |
| 6,950,534 B2 | 9/2005 | Cohen et al. | |
| 7,023,445 B1 | 4/2006 | Sell | |
| 7,227,526 B2 | 6/2007 | Hildreth et al. | |
| 7,256,788 B1 | 8/2007 | Luu et al. | |
| 7,298,913 B2 * | 11/2007 | Koto et al. | 382/239 |
| 7,305,524 B2 | 12/2007 | Hoover et al. | |
| 7,308,112 B2 | 12/2007 | Fujimura et al. | |
| 7,317,836 B2 | 1/2008 | Fujimura et al. | |
| 7,383,506 B2 | 6/2008 | Walker | |
| 7,538,772 B1 | 5/2009 | Fouladi et al. | |
| 7,545,381 B2 | 6/2009 | Huang et al. | |
| 7,580,040 B2 | 8/2009 | Huang et al. | |
| 7,590,262 B2 | 9/2009 | Fujimura et al. | |

(Continued)

FOREIGN PATENT DOCUMENTS

| | | |
|---|---|---|
| CN | 1756312 | 4/2006 |
| CN | 101427304 | 5/2009 |

(Continued)

OTHER PUBLICATIONS

Mikhail Bautin et al., "Graphic Engine Resource Management", Multimedia computing and networking 2008 (Jan. 30-31, 2008).

(Continued)

*Primary Examiner* — Mark Zimmerman
*Assistant Examiner* — Michelle Chin
(74) *Attorney, Agent, or Firm* — Gregg Wisdom; Judy Yee; Micky Minhas (57) ABSTRACT

A system is disclosed for rendering low latency resource objects by providing the latest position data from a central processing unit for the low latency resource object right before a graphic processing unit is to render the low latency resource object.

19 Claims, 9 Drawing Sheets

(56) References Cited

U.S. PATENT DOCUMENTS

| | | | | |
|---|---|---|---|---|
| 2008/0001951 | A1* | 1/2008 | Marks | A63F 13/06 345/474 |
| 2008/0152191 | A1 | 6/2008 | Fujimura et al. | |
| 2008/0268952 | A1* | 10/2008 | Ikejiri et al. | 463/31 |
| 2009/0016430 | A1 | 1/2009 | Schmit et al. | |
| 2009/0046732 | A1* | 2/2009 | Pratt et al. | 370/406 |
| 2009/0141933 | A1 | 6/2009 | Wagg | |
| 2009/0221368 | A1 | 9/2009 | Yen et al. | |
| 2009/0289954 | A1* | 11/2009 | Naito et al. | 345/629 |
| 2010/0103196 | A1* | 4/2010 | Kumar et al. | 345/633 |

FOREIGN PATENT DOCUMENTS

| | | |
|---|---|---|
| JP | 2001331246 | 11/2001 |
| JP | 2008052616 | 3/2008 |
| WO | WO2009059065 | 5/2009 |

OTHER PUBLICATIONS

Voluntary Amendments filed Nov. 22, 2011 in Chinese Patent Application No. 201110050516.3.
English translation of claims as amended in Voluntary Amendments filed Nov. 22, 2011 in Chinese Patent Application No. 201110050516.3.
Shivappa, et al., "Person Tracking With Audio-visual Cues Using the Iterative Decoding Framework," IEEE 5th International Conference on Advanced Video and Signal Based Surveillance, 2008, pp. 260-267.
Toyama, et al., "Probabilistic Tracking in a Metric Space," Eighth International Conference on Computer Vision, Vancouver, Canada, vol. 2, Jul. 2001, 8 pages.
Office Action dated filed Nov. 22, 2012 in Chinese Patent Application No. 201110050516.3.
English abstract for CN1756312 published Apr. 5, 2006.
English abstract for JP2008052616 published Mar. 6, 2008.
English abstract for JP2001331246 published Nov. 30, 2001.
Response to Office Action filed Apr. 2, 2013 in Chinese Patent Application No. 201110050516.3.
English Summary of Response to Office Action and English Translation of claims as amended in Response to Office Action filed Apr. 2, 2013 in Chinese Patent Application No. 201110050516.3.
Second Office Action dated Jun. 20, 2013 in Chinese Patent Application No. 201110050516.3.
Response to Second Office Action filed Sep. 3, 2013 in Chinese Patent Application No. 201110050516.3.
English Summary of, and English translation of claims as amended in, Response to Second Office Action filed Sep. 3, 2013 in Chinese Patent Application No. 201110050516.3.
English language Abstract of CN101427304 published May 6, 2009.
Response to Third Office Action filed Feb. 27, 2014 in Chinese Patent Application No. 201110050516.3.
English translation of claimes as amended in, and English language summary of, Response to Third Office Action filed Feb. 27, 2014 in Chinese Patent Application No. 201110050516.3.
Third Office Action dated Dec. 12, 2013 in Chinese Patent Application No. 201110050516.3.
English translation of Notice of, and English language Summary of, the Third Office Action dated Dec. 12, 2013 in Chinese Patent Application No. 201110050516.3.
Fourth Office Action, with partial English translation, dated May 29, 2014 in Chinese Patent Application No. 201110050516.3.
Response to Fourth Office Action with English translation of claims and English language summary, filed Aug. 6, 2014 in Chinese Patent Application No. 201110050516.3.
Fifth Office Action, with partial English translation, dated Oct. 8, 2014 in Chinese Patent Application No. 201110050516.3.
Response to Fifth Office Action, with English translation of claims and English language summary, filed Dec. 19, 2014 in Chinese Patent Application No. 201110050516.3.
Notice of Grant dated Mar. 2, 2015 in Chinese Patent Application No. 201110050516.3.

* cited by examiner

LOW LATENCY RENDERING OF OBJECTS

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a human computer interface ("HCI"). With HCI, user movements and poses are detected, interpreted and used to control game characters or other aspects of an application.

In game play and other such applications, an onscreen player representation, or avatar, is generated that a user may control with his or her movements. In particular, the avatar moves in the same manner as the user, mirroring his or her movements in a so-called monkey-see-monkey-do (MSDO) fashion, often within a gaming environment having other computer-generated players and a background. One drawback to conventional systems is that there is a lag, or latency, between a user movement in real space and the corresponding MSDO movement of the user's avatar. Other input systems, where actuation of a control results in an onscreen reaction of an avatar or other object, have a similar latency. While significant improvements have been made in this regard, there remains a desire to further reduce latency times.

SUMMARY

The present technology in general relates to systems and methods for rendering low latency resource objects on a graphical display. While normal objects are rendered with position data that is a few frames old, the low latency resource objects are rendered by including the latest position data from a central processing unit just before the low latency resource objects are rendered. The graphics processing unit proceeds to render other resources on the display that are not low latency resources. In the event the graphics processing unit is ready to render a low latency resource object but has not yet received the latest data from the central processing unit, a lock that has been placed on the GPU prevents it from proceeding until such data is received. Once the graphics processing unit receives the latest data from the central processing unit, the lock is removed and the low latency resource object is rendered with the up-to-date data. The hardware and software for performing the present technology are discussed in greater detail below.

In an embodiment, the present technology relates to a method of rendering objects in a frame on a display. The method includes the steps of a) rendering a first set of objects in the frame using input data for the first set of objects obtained at a first time; and b) rendering a second set of objects together with the first set of objects in the same frame, the second set of objects rendered using input data obtained at a second time later than the first time.

A further embodiment of the present technology relates to a method of the computing environment rendering objects in a frame on a display associated with the computing environment, the method comprising generating a thread for a graphics processor to render the objects in the frame, the thread including: i) render commands and pose information for a first set of objects, ii) render commands and a buffer for receipt of pose information for an object of a second set of objects, and iii) a lock command corresponding to the object of the second set of objects; rendering objects from the first set of objects; inserting pose information into the buffer for the object of the second set of objects, the pose information indicating a position of the object of the second set of objects; and pausing rendering of objects in the event the lock command is encountered before the pose information is inserted into the buffer.

A further embodiment of the present technology relates to a system for rendering three-dimensional objects on a display. The system includes a capture device for capturing image data relating to an object within a field of view of the capture device, and a computing environment. The computing environment includes a first processor for generating: i) pose information for rendering objects in a given position, ii) render commands defining appearance aspects of the objects rendered per the pose information, and iii) a lock command associated with a low latency resource object for preventing rendering of the low latency resource object until the object has been updated with pose information. The computing environment further includes a second processor for rendering a set of non-low latency resource objects and the low latency resource object, the non-low latency resource objects being rendered with pose information that is older than pose information for rendering the low latency resource objects.

DETAILED DESCRIPTION

Embodiments of the present technology will now be described with reference to FIGS. 1-11, which in general relate to a system for rendering successive frames of graphics objects where some objects in the frames are rendered using more recent position information than other objects in the frames. The present technology uses the concept of low latency resource (LLR) objects and non-LLR objects. An LLR object is one which is rendered using current position data, and may for example be a user having an onscreen MSMD avatar. Latency between a user movement and the corresponding movement with the user's avatar will be noticeable and detract from the user experience. A non-LLR object is one which may take a few frames to process with no adverse user experience consequence.

In embodiments, a first processor (also referred to herein as a central processor or CPU) generates pose information and render commands for rendering objects on a display. These objects may be representations of real world objects or they may be virtual objects existing solely in the game or application space. The pose information and render commands are passed to a second processor (also referred to as a graphics processor or GPU). Instead of passing pose information for LLR objects, placeholder buffers are created by the CPU for the LLR objects. When the GPU is ready to render an LLR object, the current pose information for that object is obtained from the CPU and inserted into the placeholder buffer. This ensures that LLR objects are rendered using current position data.

The GPU proceeds to render objects that are not LLR objects. In the event the GPU is ready to render an LLR object but has not yet received the latest data from the CPU, a lock is placed on the GPU until such data is received. Once the GPU receives the latest data from the CPU, the lock is removed and the LLR is rendered with the up-to-date data. The hardware and software for performing the present technology are discussed in greater detail below.

Figure 1:
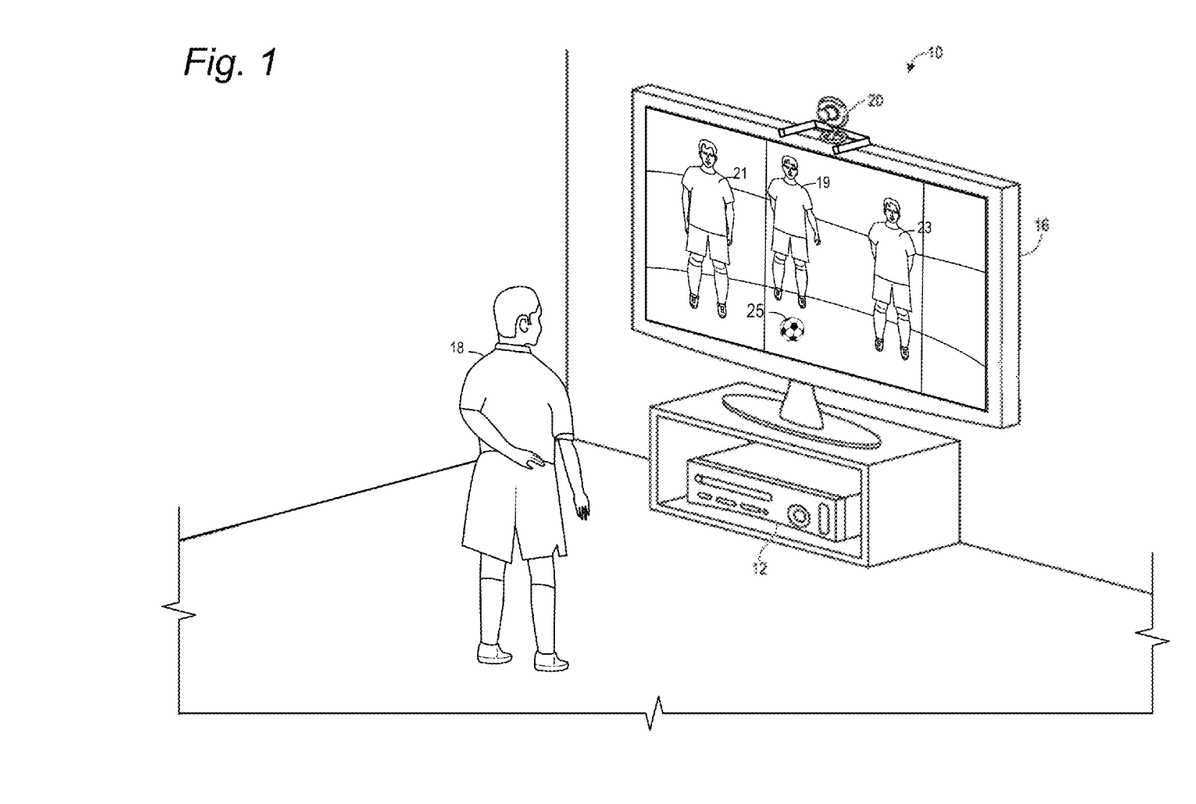
FIG. 1 illustrates an example embodiment of a target recognition, analysis, and tracking system with a user playing a game.
Figure 2:
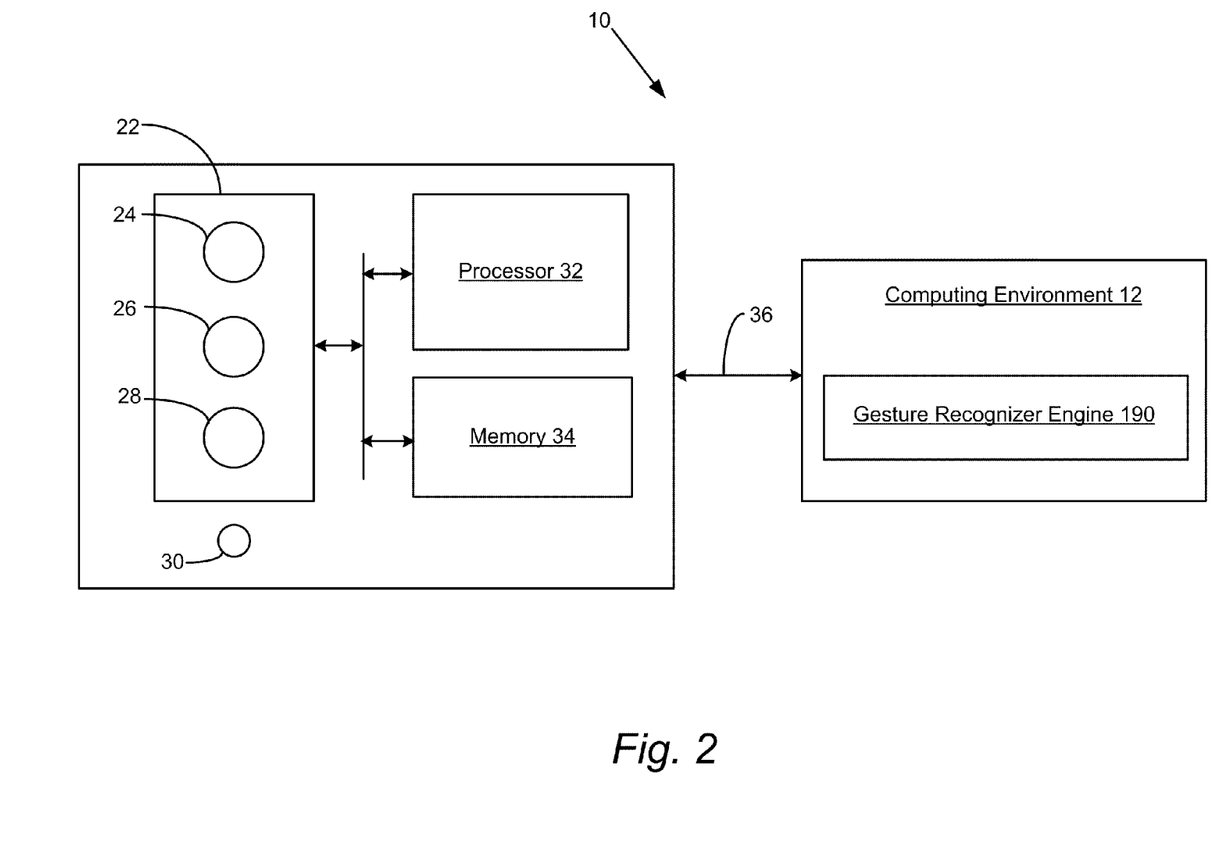
FIG. 2 illustrates an example embodiment of a capture device that may be used in a target recognition, analysis, and tracking system.

Referring initially to FIGS. 1-2, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application, and an audiovisual device 16 for providing audio and visual representations from the gaming or other application. The system 10 further includes a capture device 20 for detecting movements and gestures of a user captured by the device 20, which the computing environment receives and uses to control the gaming or other application. Each of these components is explained in greater detail below.

As shown in FIG. 1, in an example embodiment, a user 18 may interact with a gaming or other application running on computing environment 12 by moving or posing within a field of view of capture device 20. The application executing on the computing environment 12 may use the audiovisual device 16 to provide a visual representation of a player avatar 19 that the user 18 may control with his or her movements in an MSMD fashion. The application running on the computing environment 12 may also display objects in addition to avatar 19, such as other onscreen players 21, 23, and other objects with which the avatar or other players may interact, such as ball 25. The computing environment may further generate a background 27, which may for example be a playing field, a stadium with fans or a wide variety of other backgrounds. The objects generated by the application running on the computing environment 12 will vary depending on the application.

FIG. 2 illustrates an example embodiment of the capture device 20 that may be used in the target recognition, analysis, and tracking system 10. Further details relating to a capture device for use with the present technology are set forth in copending patent application Ser. No. 12/475,308, entitled "Device For Identifying And Tracking Multiple Humans Over Time," which application is incorporated herein by reference in its entirety. However, in an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles, to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may track the skeletal model and render an avatar associated with the skeletal model. The computing environment may further determine which controls to perform in an application executing on the computer environment based on, for example, gestures of the user that have been recognized from the skeletal model. Computing environment 12 may further include a gesture recognition engine 190 for recognizing these predefined gestures from the user 18. Gesture recognition engine 190 may in general include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture recognition engine 190 to identify when a user (as represented by the skeletal model) has performed one or more gestures.

Figure 3A:
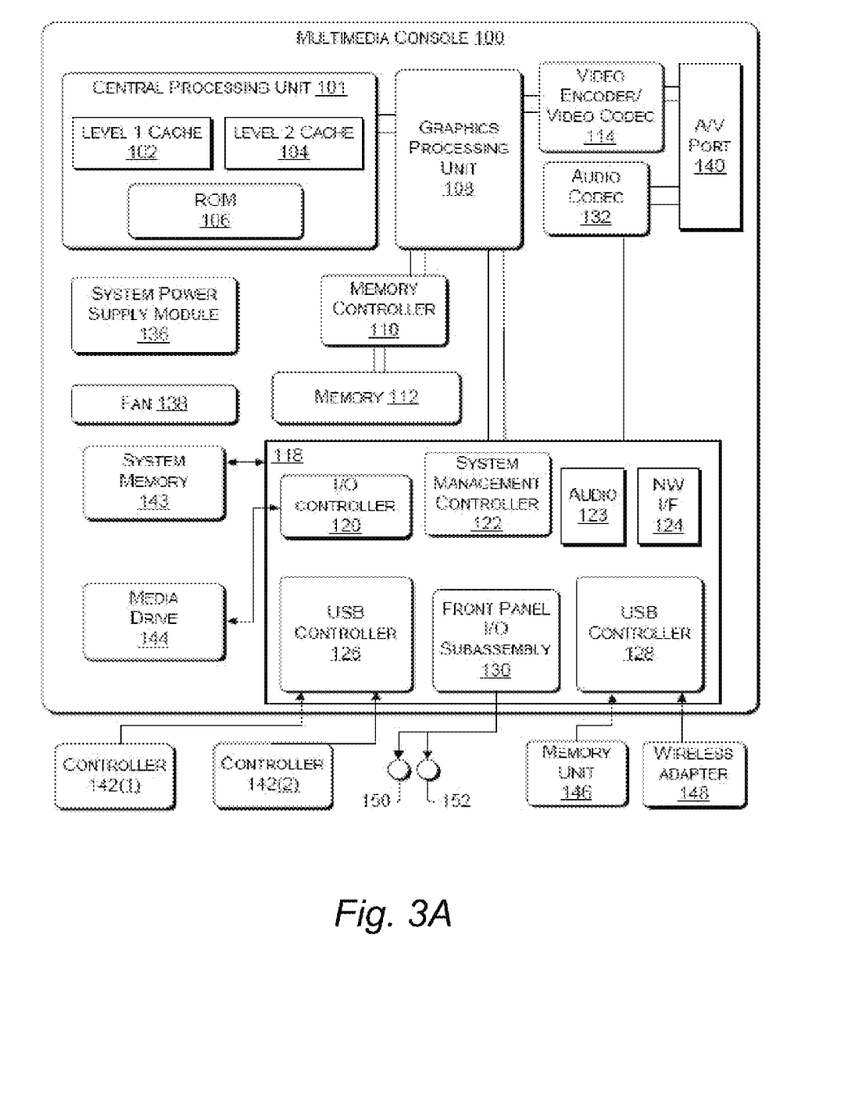
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more user movements in a target recognition, analysis, and tracking system. The computing environment such as the computing environment 12 described above with respect to FIGS. 1-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
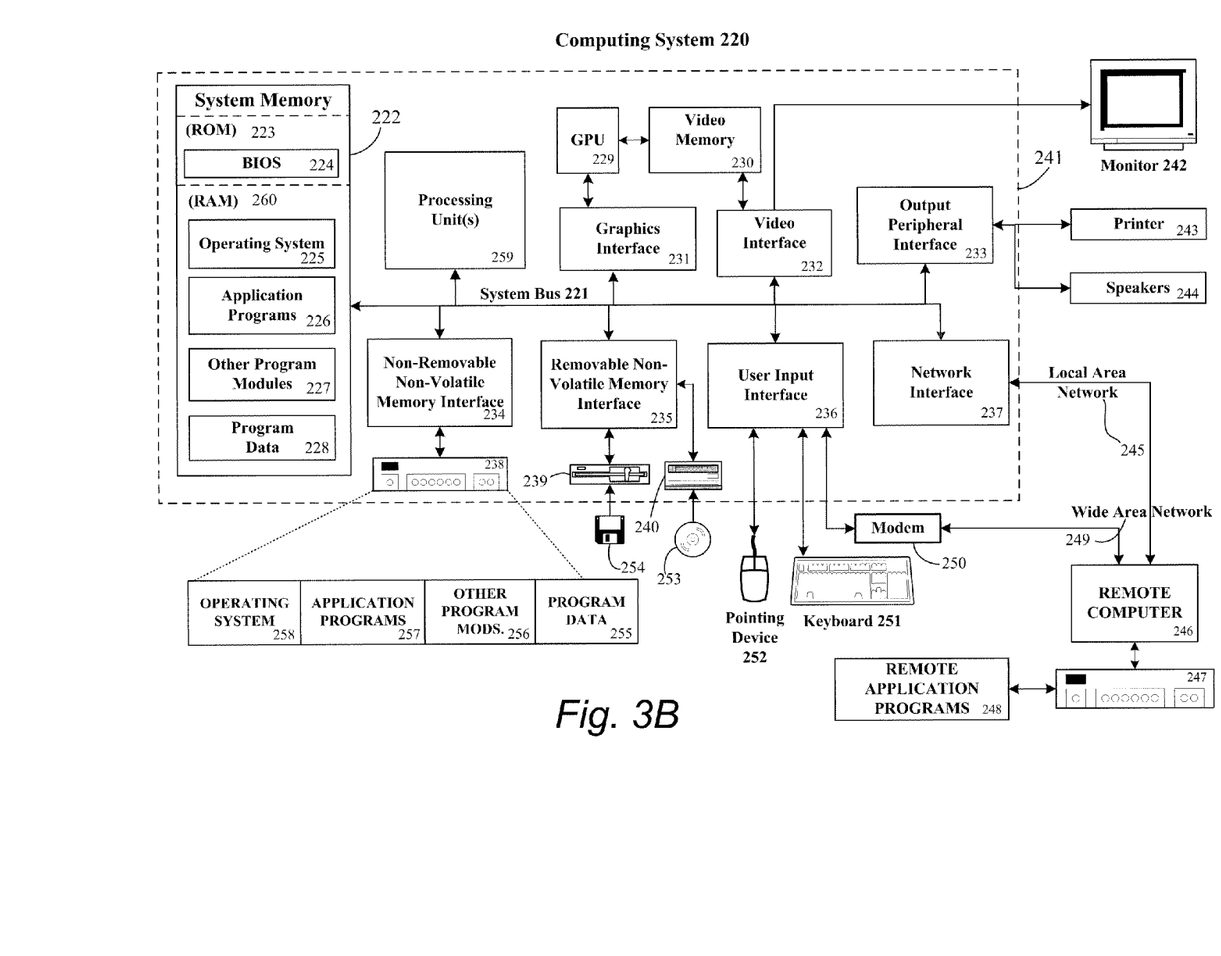
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1-2 used to interpret one or more user movements in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4:
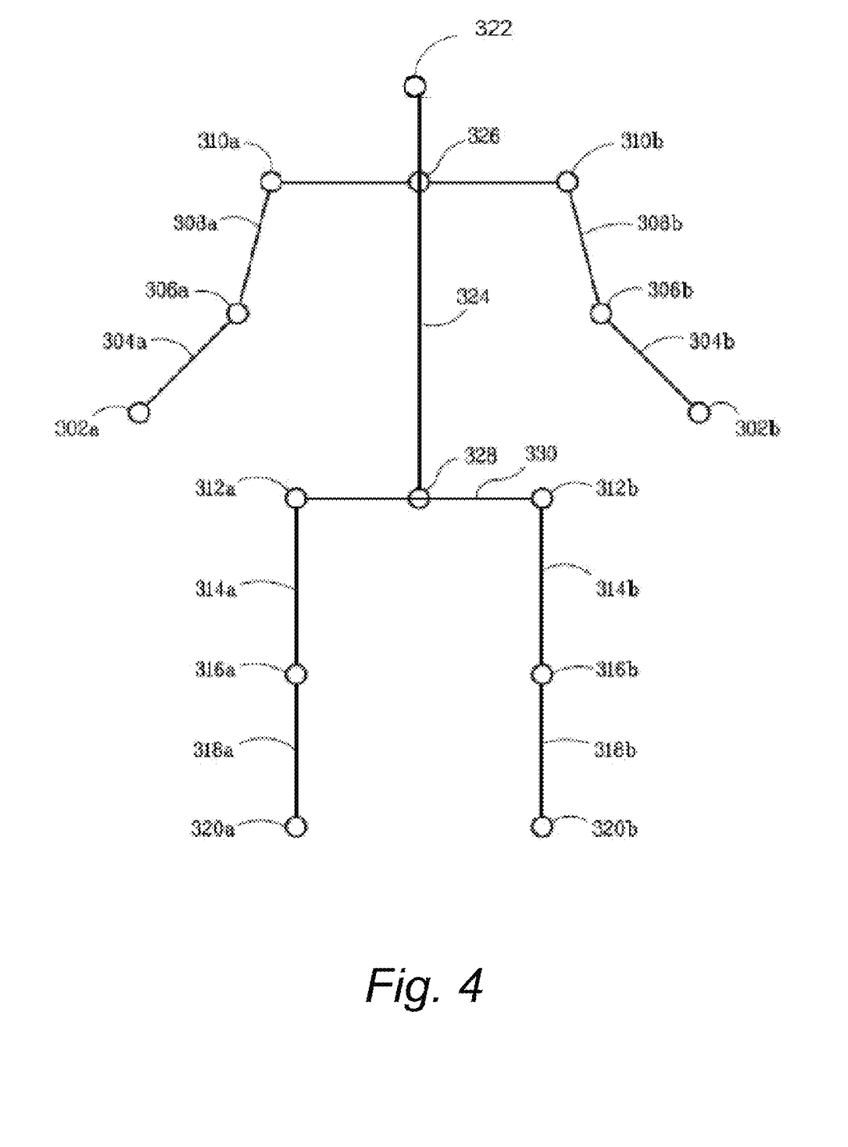
FIG. 4 illustrates a skeletal mapping of a user that has been generated from the target recognition, analysis, and tracking system of FIG. 2.

FIG. 4 depicts an example skeletal mapping of a user 18 that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and the bottom 328 of the spine, and the waist 330. Where more points are tracked, additional features may be identified, such as the bones and joints of the fingers or toes, or individual features of the face, such as the nose and eyes.

A process for rendering three-dimensional graphical objects such as avatar 19 on the audiovisual device 16 will now be described. In the description below, the central processor 101 (FIG. 3A)/259 (FIG. 3B) is referred to as a CPU, and the graphics processor 108 (FIG. 3A)/229 (FIG. 3B) is referred to as a GPU. In general, the GPU receives information from the CPU that allows the GPU to generate three-dimensional (3-D) objects on the display, including avatar 19, and objects 21 through 27 of FIG. 1. These 3-D objects are refreshed and updated for example once a frame. In embodiments, there may be 20-60 frames per second, though there may be more or less frames per second in further embodiments.

The graphics information that is passed from the CPU to the GPU is explained in greater detail below, but in general, it may take three or four frames from the time graphics information is generated to the time it is rendered. For most objects, such as for example onscreen player objects 21, 23 and background 27, this latency is undetectable and not a problem. However, where a user 18 is making movements, especially where those movements are pronounced, a three to four frame latency between the player movement and the corresponding avatar movement would be noticeable and undesirable.

As such, in accordance with the present technology, an application running on computing environment 12 may designate certain objects as low latency resource (LLR) objects. Such objects may typically be a player avatar 19, but it may also be an object with which a player avatar interacts, such as for example ball 25. Other objects may be designated as LLR objects in further embodiments. The effect of designating an object as an LLR object is that these objects are rendered without the multiple frame latency. This feature of the present technology is explained in greater detail below with reference to the flowcharts of FIGS. 5-7 and the illustrations of FIGS. 8-11.

Figure 5:
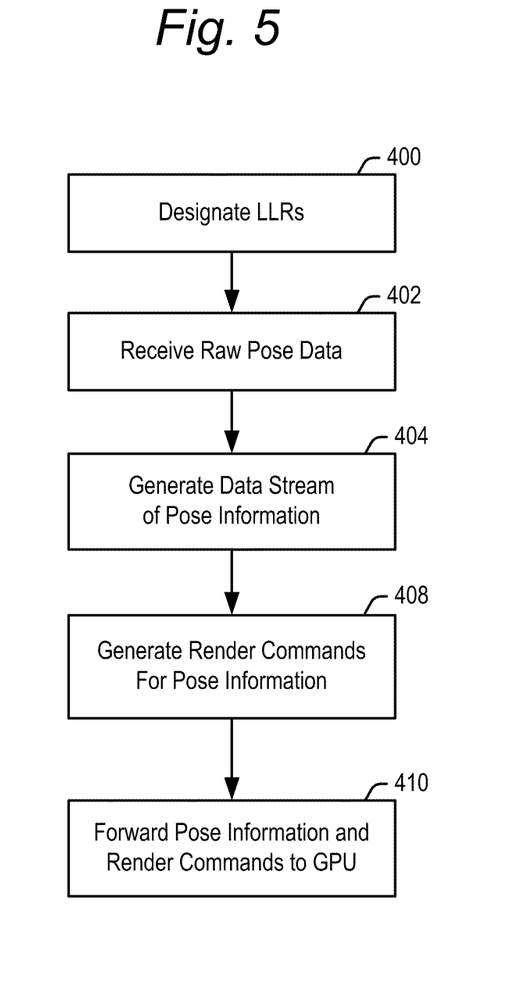
FIG. 5 is a high level flowchart of the operation of a central processing unit according to embodiments of the present technology.

The flowchart of FIG. 5 in general describes the steps performed by a CPU in accordance with the present technology. In step 400, the application running on computing environment 12 directs the CPU to designate certain objects as LLR objects. As noted above, these objects will generally be at least the user avatar 19, but may be any other object displayed to the user on audiovisual device 16 in further embodiments. A user avatar may become designated as an LLR object once the user appears in the field of view of capture device 20 and the avatar 19 is generated. There may also be multiple users, where one, some or all have avatars that are designated as LLR objects. Virtual objects may also be predefined as LLR objects in the application. As used herein, a virtual object is one created onscreen but does not exist in real world space.

In step 402, the CPU receives raw pose data from the capture device 20 regarding the current position of user 18. In step 404, the CPU takes this raw data and processes this data into pose information defining the position of the user. Pose information is also defined for virtual objects to be rendered. As this pose information is continuously generated for each object to be rendered, and for all successive frames, this pose information is generated into what is referred to herein as a pose information thread. The pose information thread generates pose information that is used by the GPU to render the position of the user avatar 19 and other objects as explained below. The processing of the raw data in step 404 for each frame or time interval by the thread may include a variety of steps in further embodiments. Some of the processes performed in step 404 are explained in greater detail with respect to the flowchart of FIG. 6.

Figure 6:
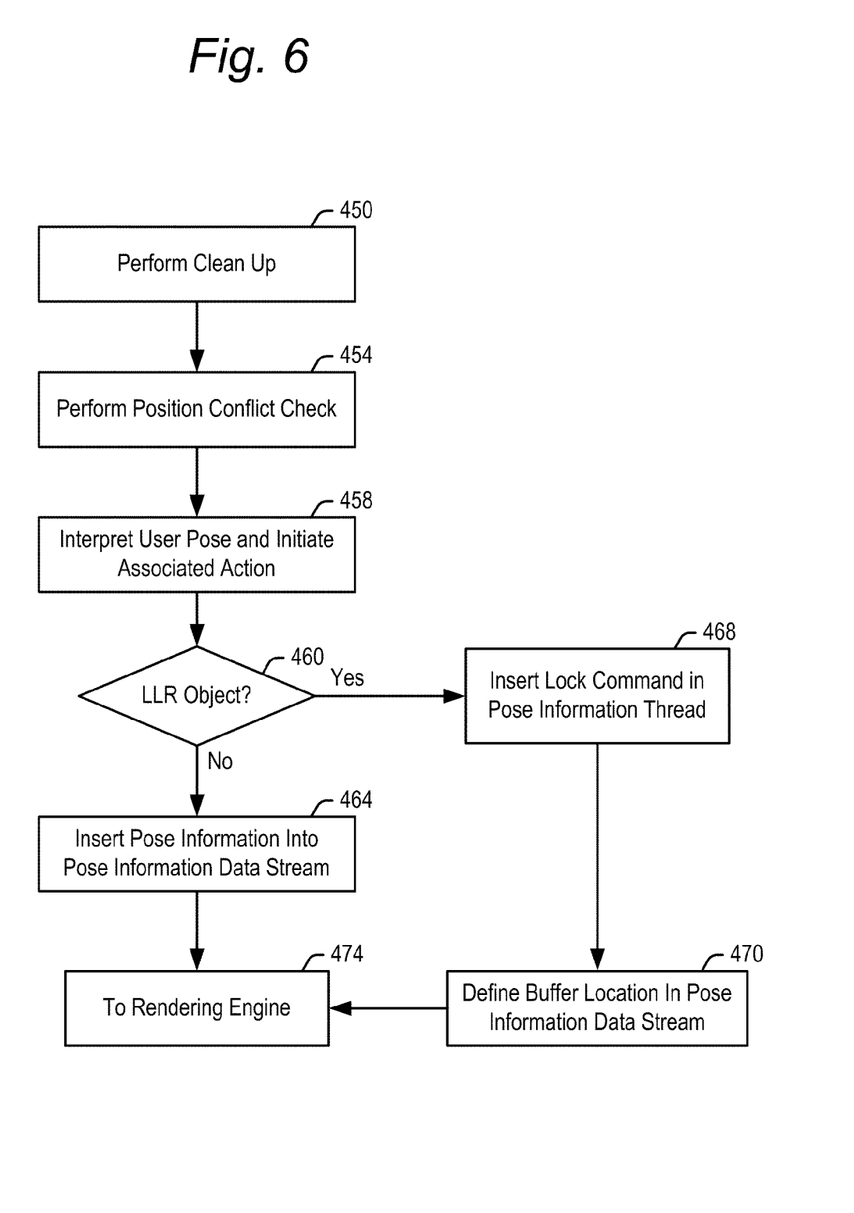
FIG. 6 is a flowchart of the operation of a central processing unit to generate pose information in buffers for low latency resource objects.

In a step 450, the CPU may perform known analysis and cleanup operations on the raw pose data to ensure that any errors in the capture device data are not rendered on the audiovisual device 16. In step 454, the CPU may perform a position conflict check to make sure that the position of the user in 3-D real world space does not translate into an avatar position which shares the same screen space as a virtual object to be rendered. For example, if the user's 3-D real world space position would translate into an onscreen position where the avatar's hand was buried in a wall, the CPU would detect the position conflict and adjust the position information that is forwarded to the graphics processor for rendering.

In step 458, the CPU interprets the raw pose data to determine if the user's position is recognized by the gaming or other application so as to trigger some predefined responsive operation by the application running on computing environment 12. A common example is the recognition by the CPU of a pose amounting to a predefined gesture. As indicate above, the CPU executes a gesture recognition engine 190 for recognizing predefined gestures. This gesture may be recognized in step 458, and the CPU in turn performs some action associated with the predefined gesture. The predefined gesture may be some in-game action (i.e., some action within the context of a gaming application), or the predefined gesture may be some control action to perform a control function within the game or as a system command. The responsive action recognized in step 458 may alternatively or additionally be some interaction of a user with an onscreen object. This could be any of a variety of actions, such as a user attaching to some onscreen object by grabbing it with a hand, or catching, throwing, kicking, hitting, etc. some onscreen object.

The CPU may next perform the steps of defining the pose information for all objects to be rendered on the screen. The pose information defined in that frame is not used for the LLR objects to be rendered a few frames hence, but that pose information may be used for LLR objects currently being rendered. This feature of the present technology is explained in greater detail below.

In step 460, the CPU may check whether a given object being considered is designated as an LLR object. If not, the object is given an ID by the thread and the associated pose information is set by the thread in step 464. All non-LLR objects may be assigned pose information in this way. This may include setting the pose information for all virtual objects to be rendered, and it may also include setting pose information for objects in the real world that are not designated as LLR objects.

On the other hand, if the object is an LLR object, a lock command may be inserted into the pose information data by the pose information thread in step 468. A lock command is a known processing command which may be forwarded to the GPU and may block the GPU from further rendering until it is cleared as explained below.

Where an LLR object is detected in step 460, in addition to the lock, the object ID may be defined by the pose information thread, but instead of inserting the measured pose information for that object, a placeholder buffer is inserted into the data stream by the thread. The buffer includes a pointer to a memory location that will include the pose information for the LLR object a few frames hence or some predefined time interval in the future. The purpose of the placeholder buffer is explained below. Once pose information has been set by the thread for non-LLR objects in step 464 and placeholder buffers have been set for any LLR objects in step 470, the CPU passes the data stream from the pose information thread to a rendering thread in step 474, which is explained with reference again to FIG. 5.

The application running on the computing environment 12 may include a rendering thread for adding graphics formatting commands to the data stream generated by the pose information thread in step 408. In particular, the CPU takes a list of the objects that need to be rendered (the non-LLR objects with pose information and the LLR objects with a placeholder buffer) and produces a detailed sequence of steps for how the GPU is to render them. The pose information thread includes information regarding the position of an object to be rendered (at least for non-LLR objects), and the render command thread adds commands for each object as to how the object is to look in that position. The render command thread specifies a variety of aspects in addition to position information, including for example texture data, shading data, vertex data, etc., which are written as GPU commands for the GPU to render the defined objects. The rendering thread includes these graphics formatting commands for both non-LLR objects and LLR objects. The data and command stream created by the pose information thread and rendering thread is then passed to the GPU in step 410.

Figure 7:
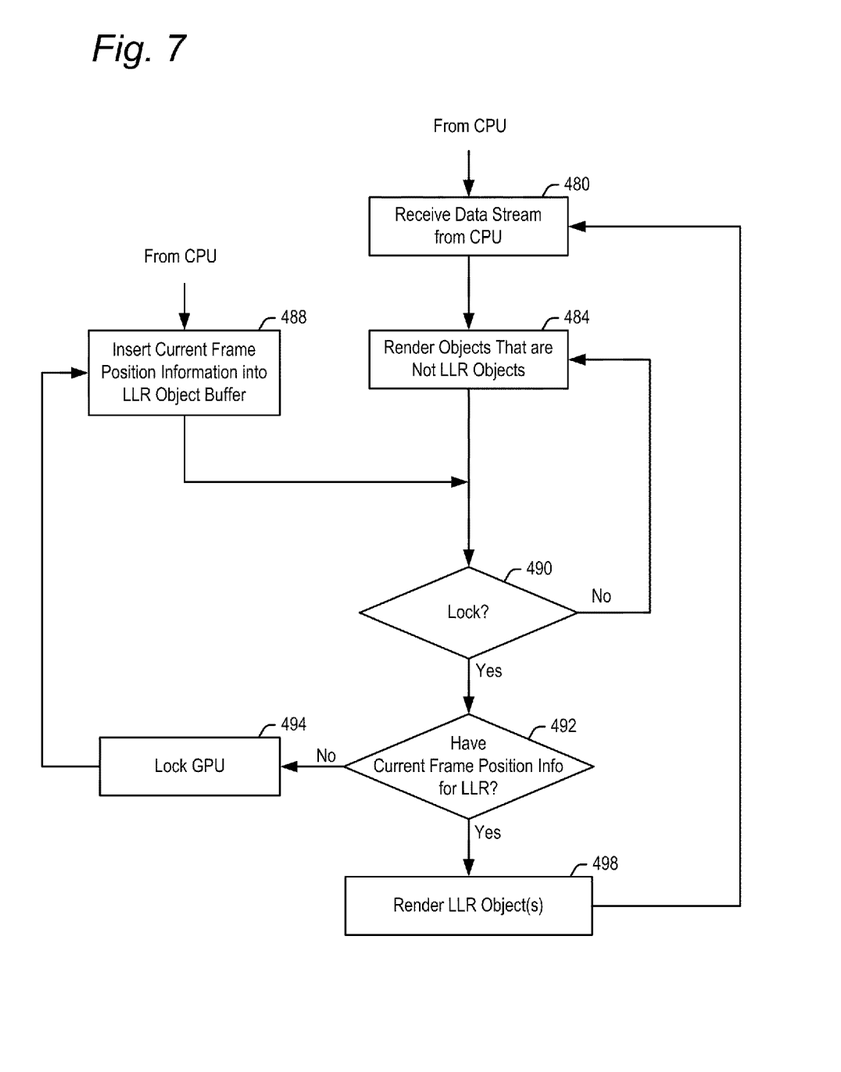
FIG. 7 is a flowchart of the operation of a graphic processing unit according to embodiments of the present technology.

The operation of the GPU in accordance with the present technology will now be explained with reference to the flowchart of FIG. 7. In an embodiment, the GPU receives the data and command stream from the CPU in step 480, and renders the objects on the audiovisual device 16. In particular, the GPU begins by rendering the non-LLR objects in step 484. These objects are rendered by the GPU using the position information from the pose information thread, and the graphics formatting commands from the rendering thread. The GPU uses this information to fill a graphics buffer with pixel information for 3-D presentation of the objects on refresh of the display in the positions indicated by the pose information and with appearances defined by the graphics formatting commands.

As the GPU renders the non-LLR objects, the GPU may at the same time identify any LLR objects in the received render command thread. Concurrently, once the CPU has generated pose information for objects including LLR objects in the current frame, the latest pose information for the LLR objects are transferred from the CPU and inserted into the buffer in step 488. Thus, while the pose information for non-LLR objects is a few frames old, the pose information used for the LLR objects is from the current frame.

The GPU executes the commands in the data and command stream to render non-LLR objects until it encounters a stop in the data and command stream in step 490. At that point, the GPU checks whether the associated LLR object has had its buffer updated with the latest pose information in step 492. In the event it has not, the lock command causes the GPU to pause mid frame in step 494 until the pose information for that LLR object has been received from the CPU in step 488. Once the GPU confirms the pose information for the LLR object has been received in step 492, the lock is cleared.

The LLR object is then rendered with the latest pose information in step 498. In this way, the frame that gets rendered by the GPU includes a mixture of objects with 2-4 frames of latency, and other objects with one frame of latency. The pose information thread and the render thread allow this process to be repeated each frame to produce fluid 3-D graphics, where certain objects such as a user avatar have a minimum or no noticeable delay between user movement and the corresponding MSMD avatar movement. In this same manner, other LLR objects that the user may interact with, such as a hand held object in real world space, and virtual objects that the user engages, may also respond onscreen with no, or minimal, delay.

Once the CPU has inserted the pose information from the current frame into a buffer of a LLR object, the lock associated with that object may be cleared or disabled by the CPU. Once the lock is disabled or cleared, the GPU proceeds as normal, reading from the memory buffer containing the pose information, just as it would for a non-LLR object. Where there are enough non-LLR objects to render, the CPU will have had sufficient time to load the current pose information into all LLR object placeholder buffers, and no pausing of the GPU will occur upon encountering the lock command. Thus, having a large number of non-LLR objects may increase the likelihood that the GPU is able to obtain the latest pose information for LLR objects before having to render the LLR objects. However, the lock ensures that the GPU will have the most up-to-date pose information for an LLR object before the LLR object is rendered. At the frame refresh rates being used (e.g., 20 to 60 times per second), any stoppage in the frame loading due to the GPU having to pause while the latest pose information for an LLR object is obtained will be minimal and difficult or impossible for a user to perceive. However, it is understood that any number of objects to be rendered in a frame may be LLR objects. In one such alternative embodiment, all objects to be rendered in the frame may be LLR objects, though such an embodiment may have delays due to the lock.

Figure 8:
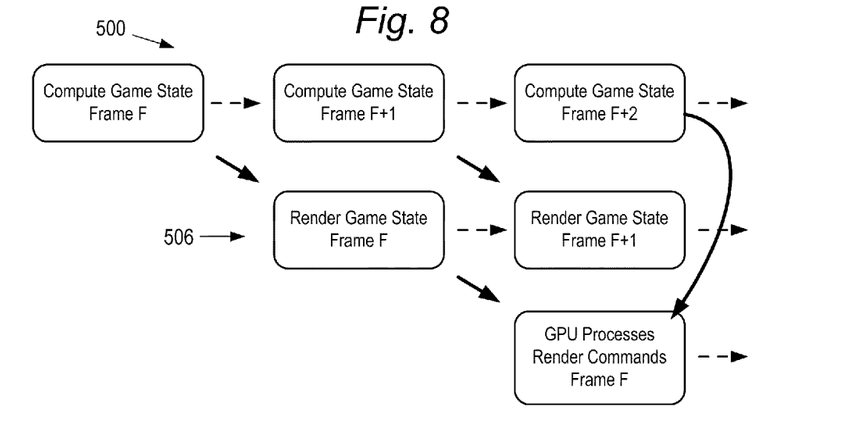
FIG. 8 is a flow diagram of the operation of an embodiment of the present technology.
Figure 9:
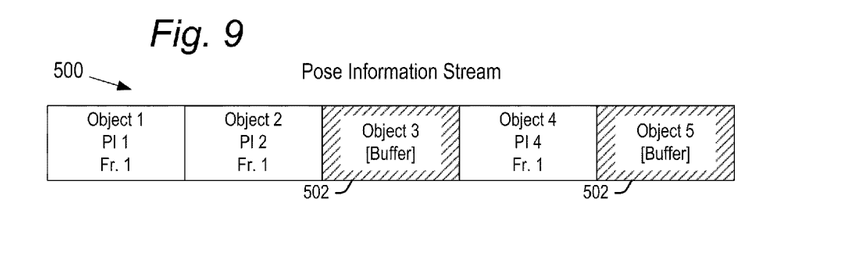
FIG. 9 is an illustration of a pose information thread according to an embodiment of the present technology.
Figure 10:
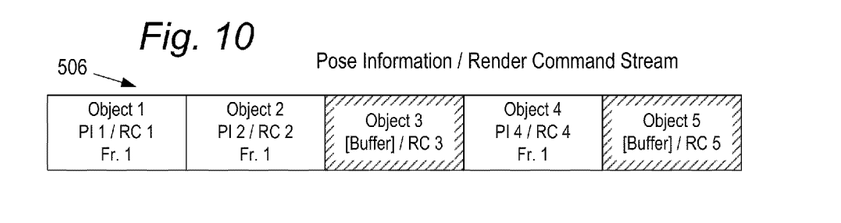
FIG. 10 is an illustration of a render command thread according to an embodiment of the present technology.
Figure 11:
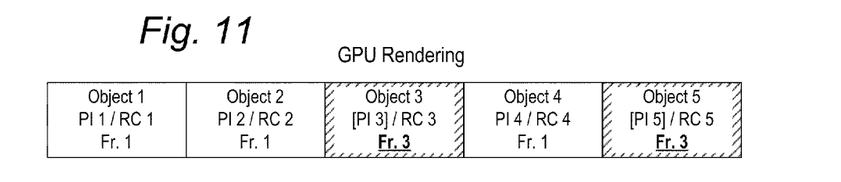
FIG. 11 is an illustration of the render command thread including updated pose information for low latency resource objects according to an embodiment of the present technology.

The flow diagram of FIG. 8 and the data/command streams of FIGS. 9-11 provide an illustrative example of the present technology. The top row of FIG. 8 shows the pose information 500 generated by the pose information thread for successive frames F, F+1 and F+2. While three frames of pose information are shown, the pose information 500 would have many more frames to provide continuously refreshed graphics to be rendered on audiovisual device 16 by the computing environment 12. The pose information thread generates pose information for each of the objects to be rendered (though rendering for LLR objects occurs at a different time as described above). In embodiments, the CPU takes a frame to generate the pose information for that frame, though it may take more frames than that in further embodiments. FIG. 8 describes a specific embodiment where the pose information thread generates discrete instances of computing game state. In this specific embodiment, the pose information may be viewed as defining what happens in a given frame of a gaming application. Other embodiments of the pose information 500 need not relate to the current state of a gaming application.

FIG. 9 shows further detail of the pose information stream for a first frame 1. FIG. 9 illustrates five objects in the pose information stream for frame 1, though there may be more or less objects to render than that. The CPU will generate data for the first frame ("Fr. 1") including an ID of, for example, a first object 1 and the pose information for the first object 1 ("PI 1"), a second object 2 and pose information for the second object 2, etc. In the example of FIG. 9, there are two LLR objects shown—object 3 and object 5. There may be more or less LLR objects in further examples. As seen, for those LLR objects, no pose information is inserted into the stream 500. Instead, these objects are identified with a placeholder buffer 502, and an associated lock command is inserted into the stream 500.

Returning to FIG. 8, the CPU passes the pose information 500 to the rendering thread, which generates the render commands to add to the pose information stream, resulting in pose information/render command stream 506. In embodiments, the CPU takes a frame to generate the render commands and add them to the pose information. Thus, while the rendering thread is generating the commands for frame F in the render command stream, the pose information thread is generating the pose information for the next subsequent frame F+1. It is understood that it may take more than a frame to generate the render commands for all objects to be rendered. FIG. 10 shows the pose information/render command stream 506 with the render commands ("RC") added to each object.

Returning again to FIG. 8, the pose information/render command stream 506 is passed from the CPU to the GPU and the GPU processes the stream 506 for the frame F. In embodiments, it takes a frame for the GPU to render the objects, so that when the GPU is rendering the objects for frame F, the CPU is obtaining the pose information for frame F+2.

As indicated by FIGS. 8 and 11, in accordance with the present technology, pose information for the most current frame of an LLR object is inserted into the buffer for that object prior to its rendering by the GPU. Thus, while the non-LLR objects rendered in FIG. 11 have pose information from frame 1, the LLR objects are rendered with pose information from the latest frame 3. In the embodiment described above, it took two frames for the CPU to generate pose information and render commands. Thus, present technology is able to insert pose information into LLR objects that is two frames more current. In a further embodiment where it takes two frames to generate pose and render commands, the present technology may take a frame and render LLR objects that are a single frame more current.

In embodiments where it takes more frames to generate the pose information and render commands, the pose information inserted into LLR objects would be that many more frames current. For example, if it took three or four frames to generate pose information and render commands, the present technology allows the pose information for LLR objects to be one, two, three or four frames more current than that rendered for non-LLR objects. These examples of two, three and four frames to generate pose information and render commands are by way of example only, and it may take more than that, or alternatively a single frame, in further embodiments. In such instances, the present technology provides more recent pose information for LLR objects than for other objects where latency is less critical.

The present technology has been described above in terms of receiving input data from a capture device to generate pose information for an avatar to act in a MSMD manner with respect to a user. However, it is understood that the present technology may be used with other input data in other input systems. For example, a user may actuate a hand-held control, which actuation causes some on screen object to perform in a certain way. The present technology may be used to reduce the latency in any such system in accordance with the above-description.

Moreover, while pose information has been used above as the specific data which is carried forward and inserted into a buffer to reduce latency, it is understood that any input data resulting in an onscreen rendering of a low latency resource object may be carried forward and inserted into a buffer. For example, in the above instance where a user actuates a hand-held control, the computing environment may render an object in response to actuation of the hand-held control with a low latency response time in accordance with the present technology.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. In a system comprising a computing environment receiving pose data from a capture device, a method of the computing environment rendering objects in a video frame on a display associated with the computing environment, the method comprising:
   a) capturing pose information for first and second objects at a first time;
   b) generating a thread at a second time after the first time for a graphics processor to render the first and second objects in the frame, the thread including: i) render commands and pose information for the first object obtained at the first time, ii) render commands and a buffer for receipt of pose information for the second object;
   c) rendering the first object in the frame at a third time after the second time using the pose information for the first object obtained at the first time;
   d) inserting pose information into the buffer for the second object, the pose information indicating a position of the second object at a time after the first time; and
   e) rendering the second object in the frame at the third time using the pose information for the second object obtained in said step d).

2. The method of claim 1, said step a) comprising the step of using pose information obtained from a camera capturing user position.

3. The method of claim 1, said step a) comprising the step of using input data from a hand-actuated controller.

4. The method of claim 1, further comprising the step of pausing the rendering of the second object in the event the pose information for the second object has not yet been provided for the second object at the third time.

5. The method of claim 1, further comprising the step of including a lock command in data received by a graphics processor in performing the rendering steps c) and e), the lock pausing the rendering of the second object in the event the pose information for the second object has not yet been provided for the second object at the third time.

6. The method of claim 1, wherein said step e) comprises a graphics processor rendering the second object with the most recent pose information available to a processor receiving the pose information.

7. The method of claim 1, wherein second object rendered in said step e) use pose information that is one to four frames more recent than the pose information used in said step c) of rendering the first object.

8. The method of claim 1, wherein said step e) comprises rendering an avatar mimicking movements of a user.

9. A method of rendering objects in a video frame on a display, comprising:
   a) capturing pose information for an object at a first time;
   b) processing the pose information for the object at a second time later than the first time in the frame;
   c) determining whether the object is designated as a low latency object;
   d) rendering image data for the object at a third time after the second time, using the pose information captured at the first time, where it is determined in said step c) that the object is not a low latency object;
   e) capturing updated pose information for the object at a fourth time later than the second time where it is determined in said step c) that the object is a low latency object; and
   f) rendering image data for the object at the third time, using the pose information captured at the fourth time, where it is determined in said step c) that the object is a low latency object.

10. The method of claim 9, said step a) comprising the step of using pose information obtained from a camera capturing user position.

11. The method of claim 9, said step a) comprising the step of using input data from a hand-actuated controller.

12. The method of claim 9, further comprising the step of pausing the rendering of the second object in the event the pose information for the second object has not yet been provided for the second object at the third time.

13. The method of claim 9, further comprising the step of including a lock command in data received by a graphics processor in performing the rendering steps c) and d), the lock pausing the rendering of the second object in the event the pose information for the second object has not yet been provided for the second object at the third time.

14. The method of claim 9, wherein said step d) comprises a graphics processor rendering the second object with the most recent pose information available to a processor receiving the pose information.

15. A computing system, comprising:
   a central processor operable to:
      a) receive pose information for an object at a first time,
      b) process the pose information for the object at a second time later than the first time in the frame,
      c) determine whether the object is designated as a low latency object, and
      d) receive updated pose information for the object at a fourth time later than the second time where it is determined in said step c) that the object is a low latency object; and
   a graphics processor operable to:
      e) render image data for the object at a third time after the second time, using the pose information captured at the first time, where it is determined in said step c) that the object is not a low latency object, and
      f) render image data for the object at the third time, using the pose information captured at the fourth time, where it is determined in said step c) that the object is a low latency object.

16. The computing system of claim 15, further comprising a camera for capturing user position and providing the pose information in said step a).

17. The computing system of claim 15, further comprising a hand-actuated controller for providing input data used by the central processor to process pose information.

18. The computing system of claim 15, the central processor pausing the rendering of the second object in the event the pose information for the second object has not yet been provided for the second object at the third time.

19. The computing system of claim 15, the central processor generating a lock command in data received by the graphics processor in performing the rendering steps e) and f), the lock pausing the rendering of the second object in the event the pose information for the second object has not yet been provided for the second object at the third time.

* * * * *